United States Patent [19]

Joergensen

[11] 4,202,064

[45] May 13, 1980

[54] UNIT FOR VERTICAL AND HORIZONTAL PERSONAL TRANSPORT

[76] Inventor: Gunnar I. Joergensen, Ellemosevej 39, DK-2900 Hellerup, Denmark

[21] Appl. No.: 898,407

[22] Filed: Apr. 20, 1978

[30] Foreign Application Priority Data

Apr. 26, 1977 [DK] Denmark ............................ 1831/77

[51] Int. Cl.[2] ......................... A61C 1/02; A47C 17/40

[52] U.S. Cl. ............................................. 5/83; 5/88; 5/89

[58] Field of Search .................... 5/81 R, 10 R, 83, 85, 5/86, 66, 89, 68; 182/2

[56] References Cited

U.S. PATENT DOCUMENTS

| | | | |
|---|---|---|---|
| 2,272,778 | 2/1942 | Reuter | 5/89 |
| 3,139,948 | 7/1964 | Rorden | 182/2 |
| 3,351,959 | 11/1967 | Turpin | 5/83 |
| 3,644,945 | 2/1972 | Goodman et al. | 5/68 |
| 3,882,554 | 5/1975 | Glass | 5/83 |

FOREIGN PATENT DOCUMENTS

| | | | |
|---|---|---|---|
| 2460858 | 6/1976 | Fed. Rep. of Germany | 5/83 |

*Primary Examiner*—Casmir A. Nunberg
*Attorney, Agent, or Firm*—Burgess, Ryan and Wayne

[57] ABSTRACT

A coordinate-type hoist device for lifting a handicapped person and allowing the person to move throughout a room. The device consists of two fixed rails disposed parallel to each other and presumably near the ceiling of the room. Two transverse rails ride along the fixed rails, and a "crab" rides along the two parallel transverse rails. The crab contains a motor arrangement for raising and lowering at least two hoisting straps. By using the apparatus, a handicapped person can sit or lie in a device to which the hoisting straps can be attached. Thereafter the crab motor can raise the hoisting straps to lift the patient, who can then move about the room by moving the crab along the transverse rails, and/or moving the transverse rails along the fixed rails. Alternatively, these crab and rail mvoements can be motor controlled. Limit switches are provided to prevent jamming and overloads, and a low voltage control system is utilized of safety purposes.

10 Claims, 13 Drawing Figures

UNIT FOR VERTICAL AND HORIZONTAL PERSONAL TRANSPORT

This invention concerns a unit for vertical and horizontal transport of handicapped and invalid persons, covering a crab from a hoist. In the past, industrial hoists have been used for the transport of invalid and handicapped persons, the hoists suspended in a crab running on a rail at the ceiling. These designs are large and rather awkward and will always require a permit to be obtained with the authorities in each and every case prior to mounting since these hoists are intended for heavy current operation. Since they are standard hoists for load transport, they do not have the safety equipment required for transport of persons. Finally, these hoists are tied to the rail track.

Various special types of personal transport devices are known, but none of these has met with the approval of the authorities.

The designs known so far are also large and awkward and are based on a single-string supporting strap, the latter providing an imperfect directional stability.

The purpose of this invention is to establish a unit of the type referred to which will remedy the drawbacks of the known designs, and which are provided with the safety measures laid down for transport of persons.

Another purpose of this invention is to establish a unit rendering it possible for invalids and handicapped persons to transport themselves round a particular room without any aid or to move themselves between their lying position and their wheel chairs or from their wheel chairs to a fixed chair, and making it possible in a hospital or nursing home and in private homes, too, for a single person to lift, move, and transport even heavy persons without any particular effort.

This is achieved by the unit according to to the invention which is characterized by the fact that . . .

- the crab is running embedded on two parallel cross rails,
- these two cross rails are running embedded on two other, firmly mounted main rails,
- the hoist motor has been mounted on a plate of electrically insulating material,
- that the hoist motor power supply is effected through the two running cross rails since they are electrically connected with one each of the current supply poles,
- the hoist motor through gearing will pull a shaft for unwinding two hoist straps,
- the shaft referred to is provided with a limit switch which will be actuated following a predetermined number of revolutions of the shaft in one or the other direction,
- that there will be ways of cutting off power supply in case of erroneous unwinding of the hoist straps, and
- that a supporting unit will be suspended in the hoist straps, and that that unit will have a removable support in the shape of a fabric track.

Figure 1:
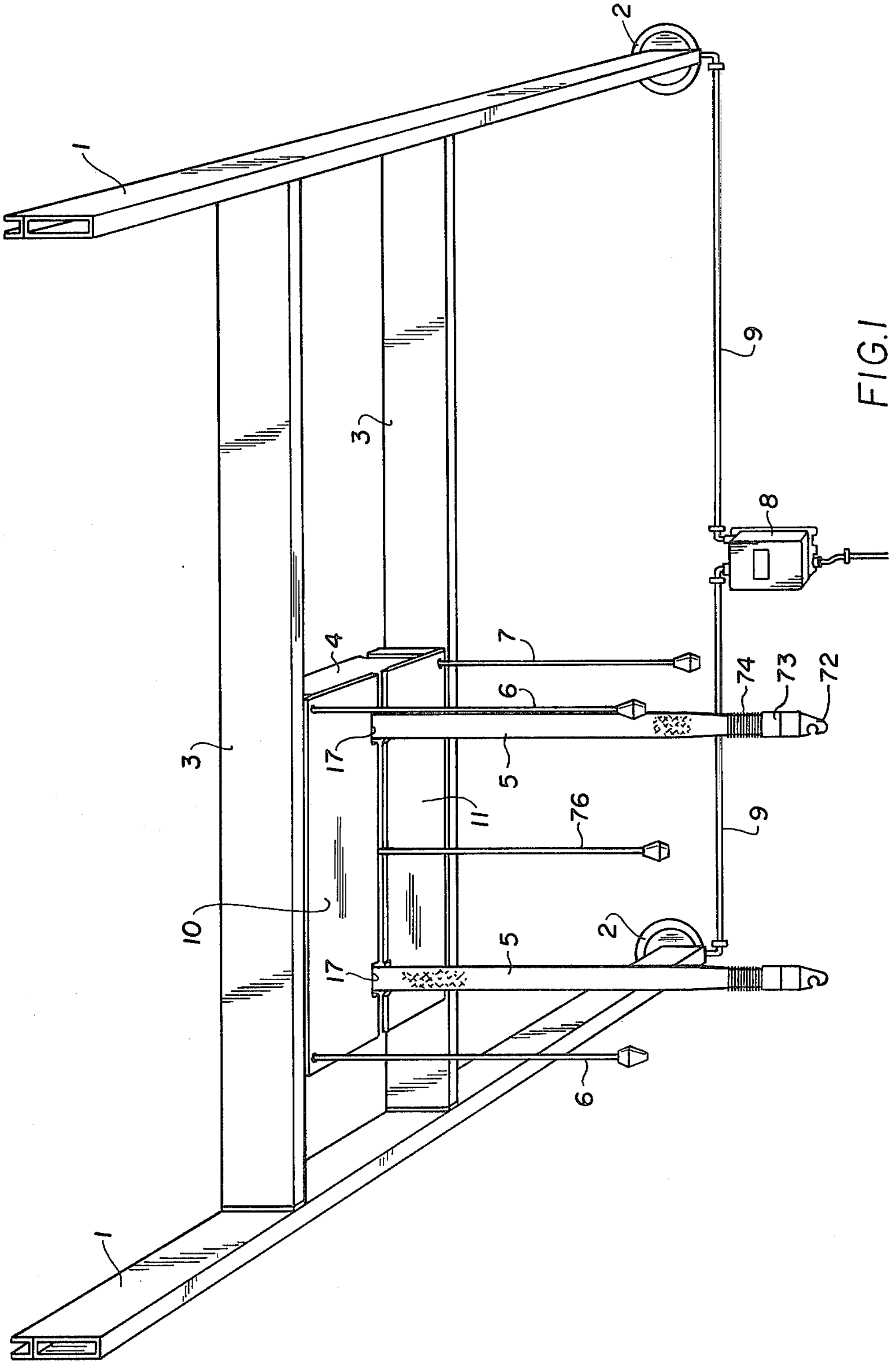
Figure 2:
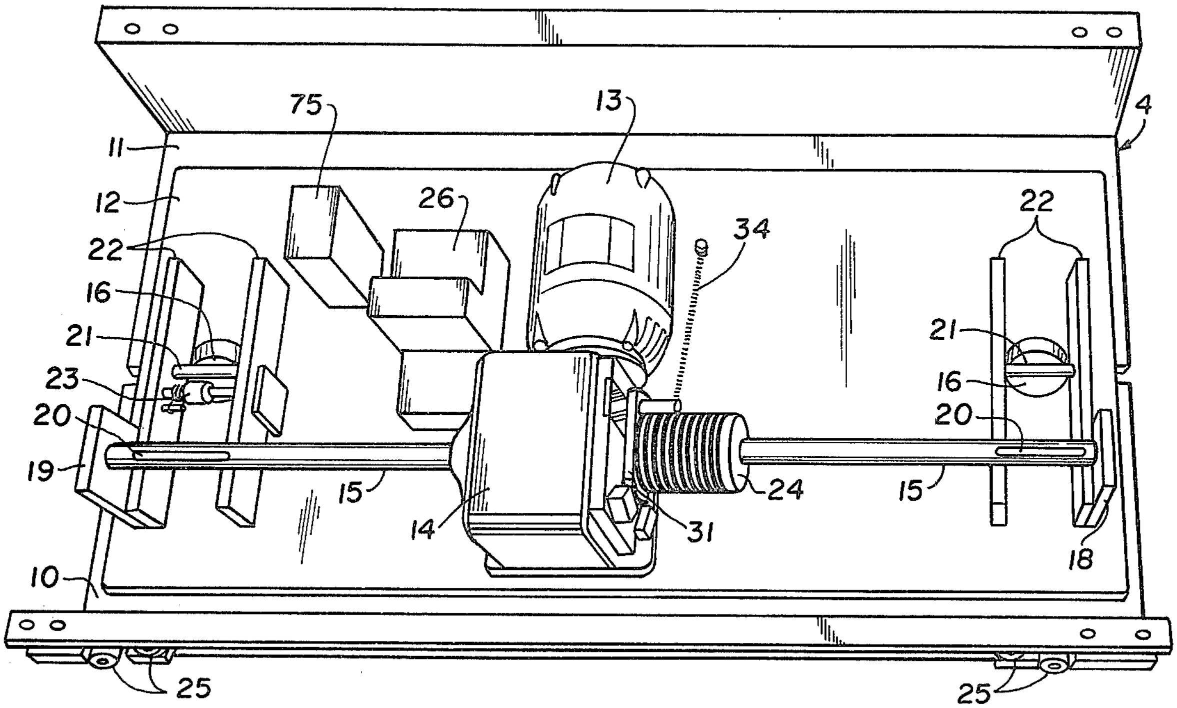
Figure 3:
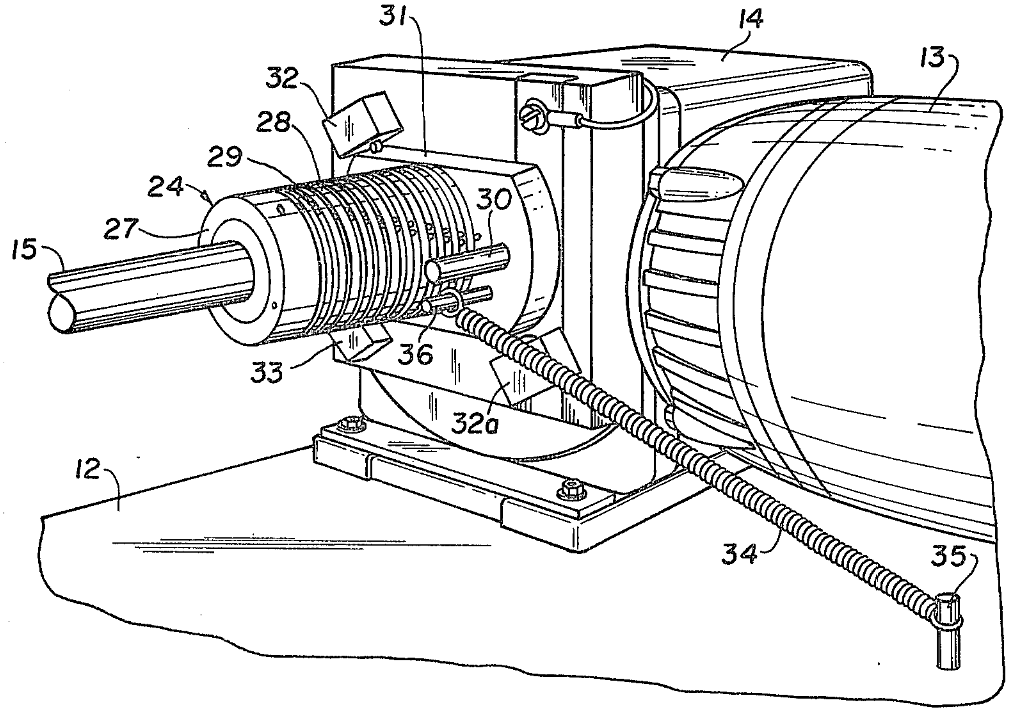
Figure 4:
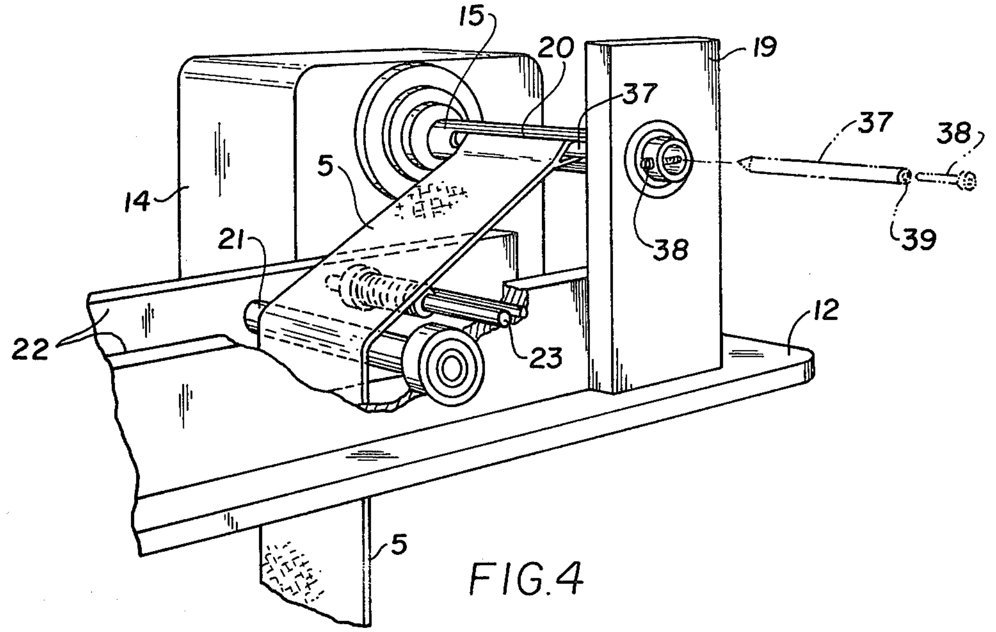
Figure 5:
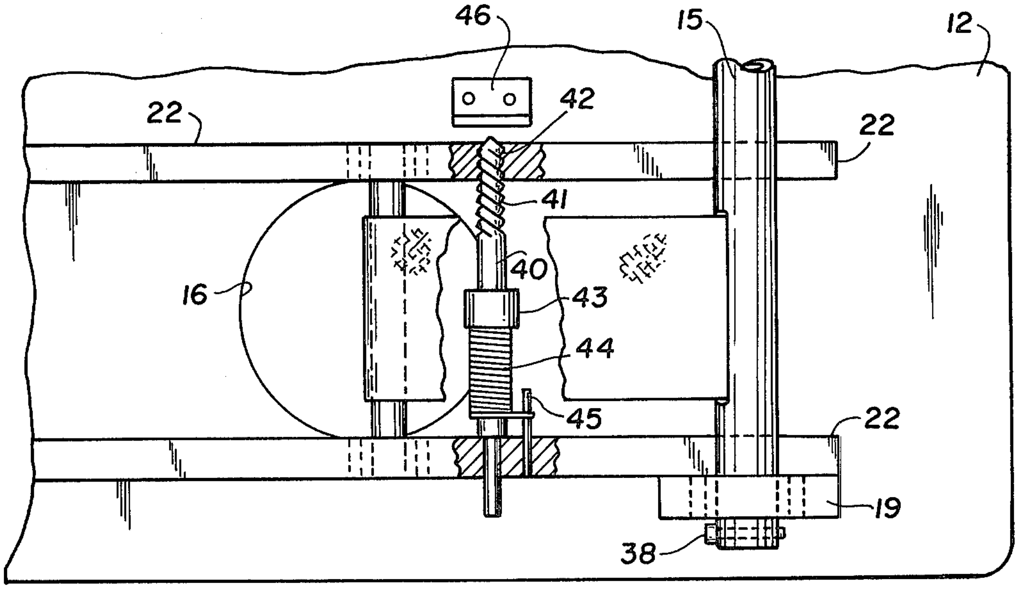
Figure 6:
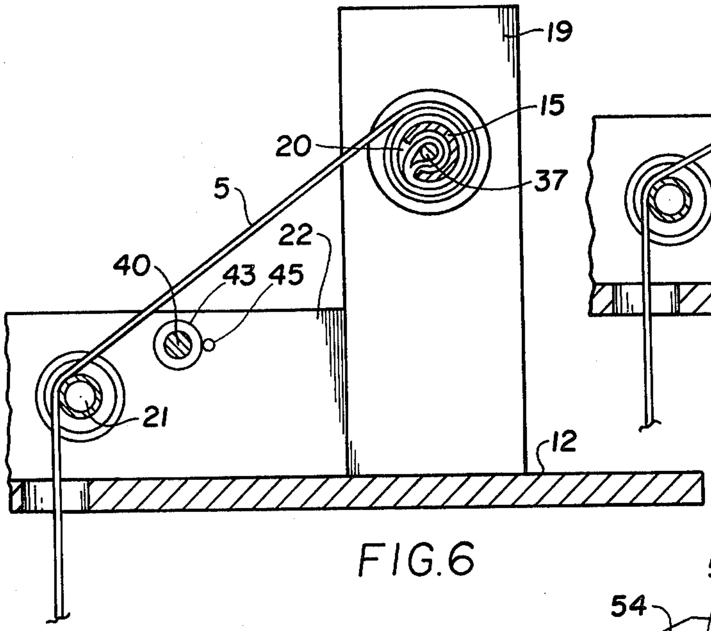
Figure 7:
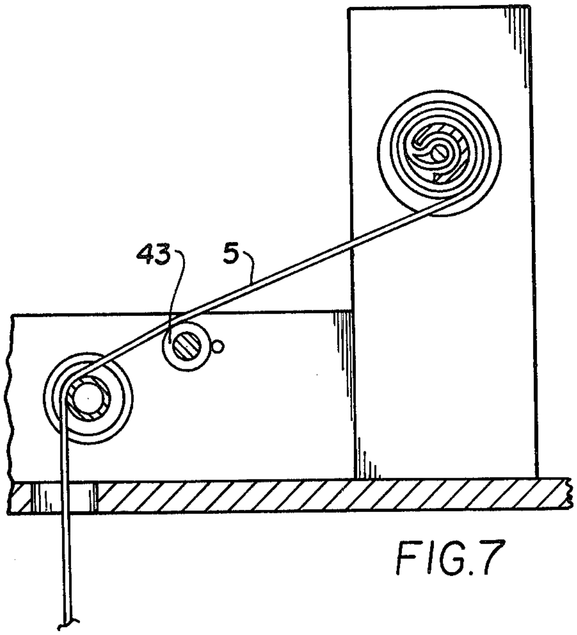
Figure 8:
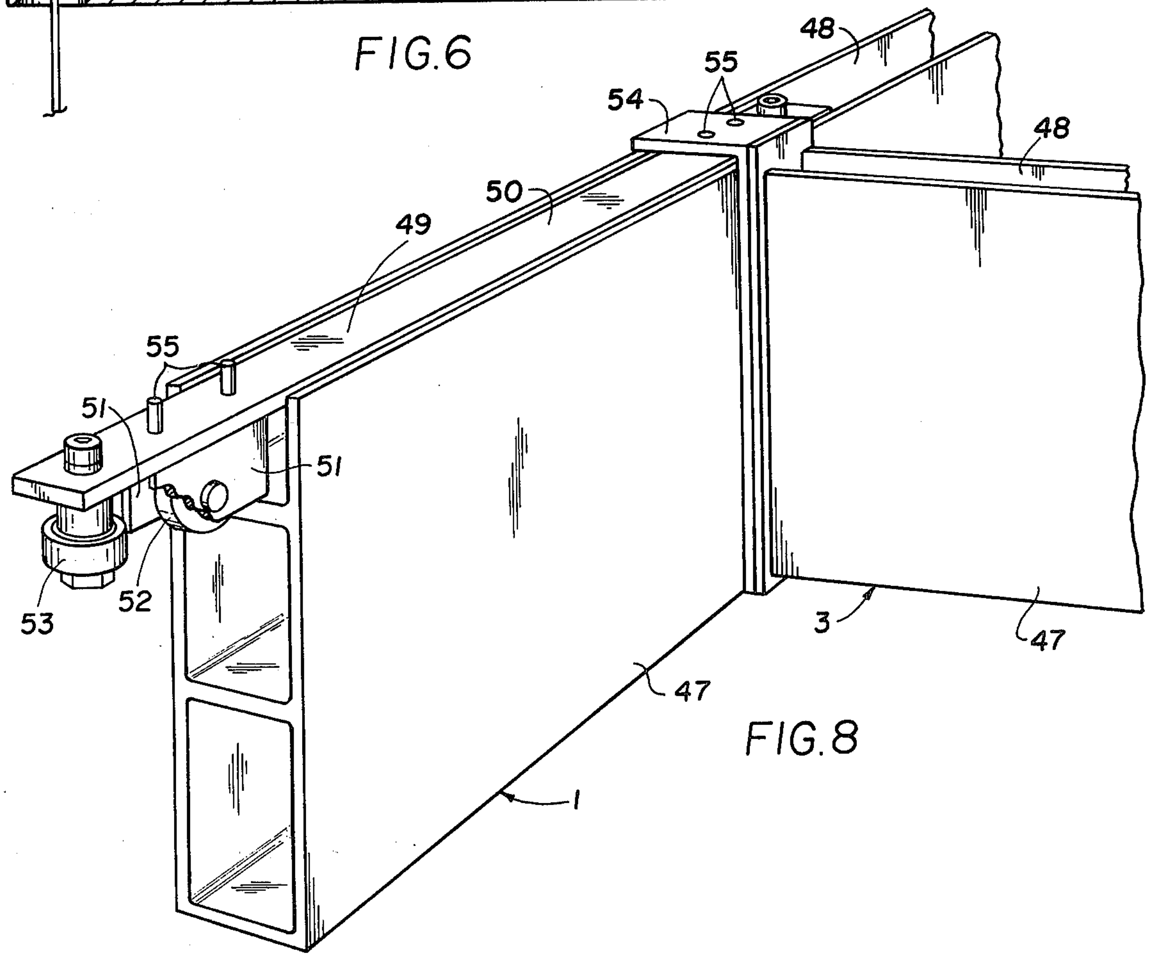
Figures 9, 9A:
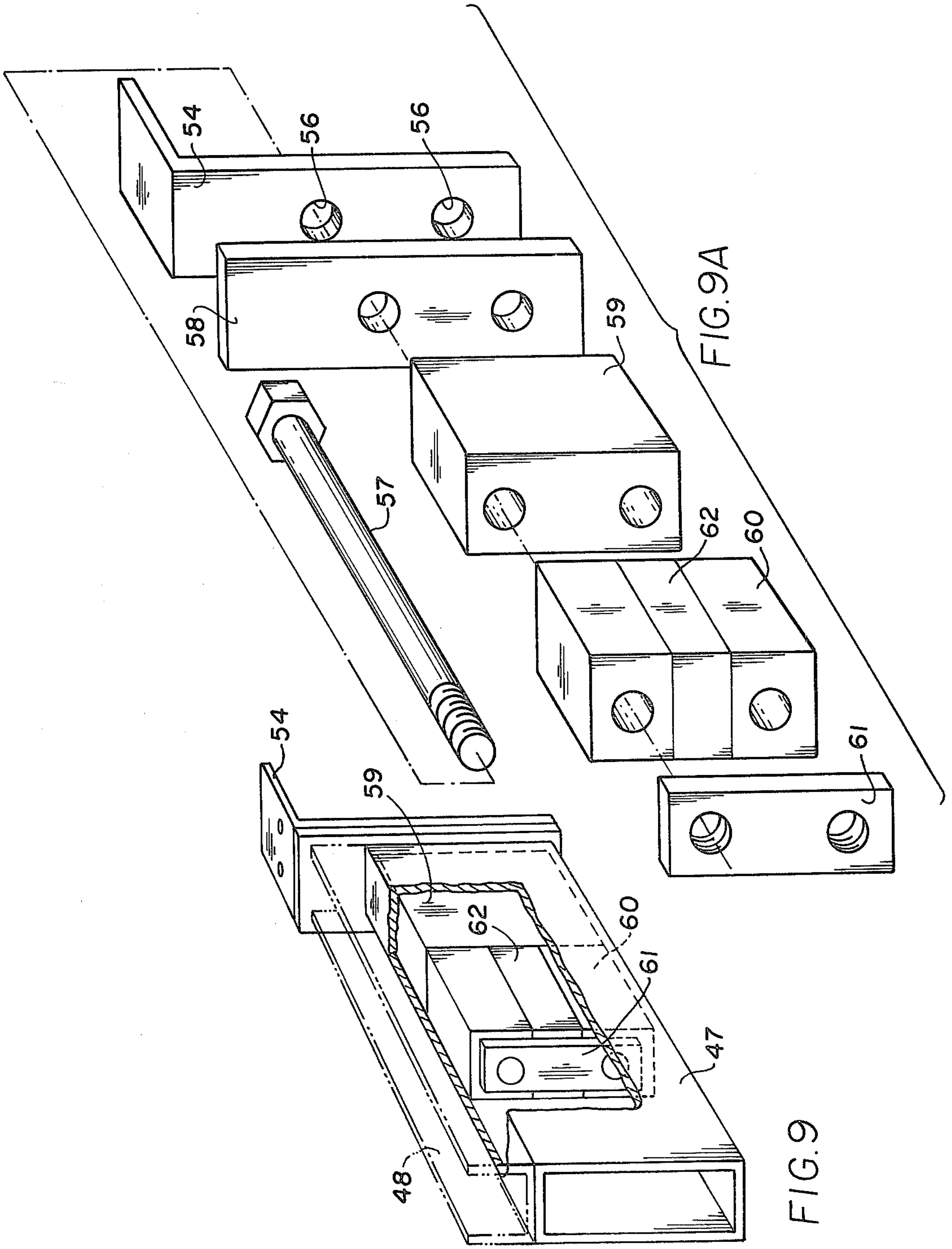

The invention is explained further below with reference to the drawings wherein:

FIG. 1 shows a preferred design of a unit according to the invention, viewed in perspective, FIG. 2 a design for the crab used in this unit, viewed from the top, cover plates removed, FIG. 3 details of the limit switch used in the hoist, FIG. 4 a detail of how the hoist straps are attached to the hoist shaft, FIG. 5 a section of the crab with safety unit to prevent erroneous unwinding of hoist straps, viewed from above, FIGS. 6, 7 safety unit in FIG. 5, viewed from the side, FIG. 8 a section of running rails with a trolley, FIG. 9 mounting details for cross rail mounting, FIG. 9A is an exploded perspective view of the mounting arrangement shown in FIG. 9.

Figure 10:
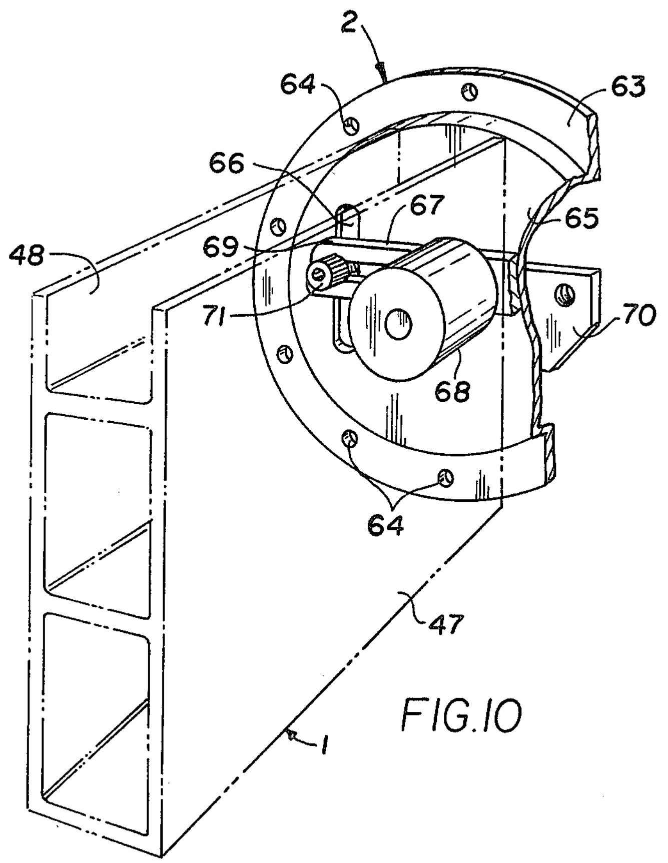
Figure 11:
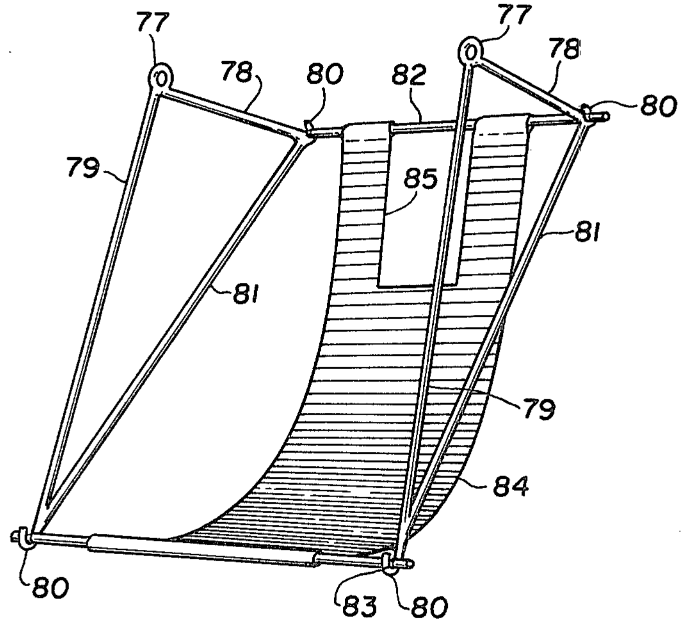

FIG. 10 suspension fittings of main rails,

FIG. 11 a chair for suspension in the hoist straps and

Figure 12:
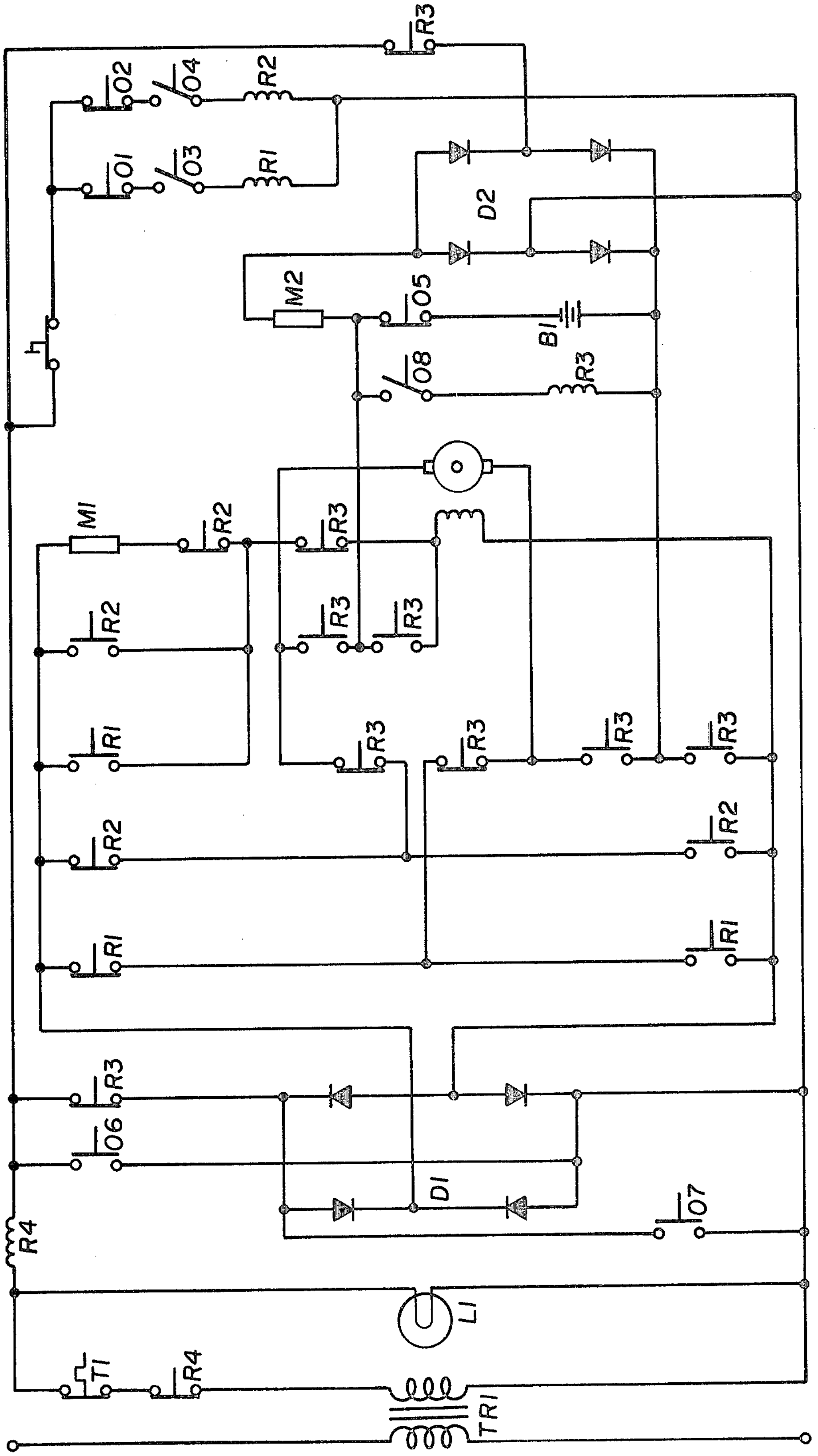

FIG. 12 a diagramme for the electric circuit.

The unit according to the invention, as shown in FIG. 1, consists of two main rails 1 attached to the opposite wall surfaces by fittings 2. Between these main rails, two other rails 3 have been placed, and these may run along the main rails 1. Along these rails 3, a crab 4, placed between them, may run, and this crab has two hoist straps and two operation cords 6 and 7.

This arrangement will obviously enable the crab 4 to assume any position within the two main rails 1. If the main rails 1 run along opposite walls of a room, a person sitting in a chair suspended in the hoist straps 5 will be able to be moved or to move from anywhere in the room to some other place in the room.

The power supply to the hoist is being effected from a fuse box 8 from where, via a separation transformer, power is transferred to the two main rails 1 through lines 9, one main rail receiving the phase and the other main rail zero. The voltage added should preferably be a low, harmless type, such as 32 volt. The voltage is connected to the two rails 3, one of these having been insulated against one main rail 1, the other rail having been insulated against the other main rail 1. The crab 4 has been divided into two halves 10 and 11 insulated from each other, and the hoist motor is thus supplied from each crab half. FIG. 2 shows an example of a design of a crab 4. The crab consists of two steel plates 10 and 11, bent right-angled, connected with an insulating plate 12. On this plate 12, a hoist motor 13 with gearing 14 has been mounted; the shaft 15 of this gearing projecting beyond both sides. At one end, the shaft 15 has been embedded in a bearing block 18. At the other end, shaft 15 is also supported by a bearing block 19. Shaft 15 has been provided, close to bearing blocks 18 and 19, with slits 20 for attachment of hoist straps 5. Straps 5 go via a supporting shaft 21, mounted between two bearing brackets 22 and placed over a hole 16 in the plate 12 and a slit 17 between the two crab halves 10 and 11. At one supporting shaft 21, a unit 23 has been mounted to prevent erroneous unwinding of straps 5. Shaft 15 has also been equipped with a limit switch 24 the function of which, plus the function of unit 23 as well as the mounting of the straps, will be explained later.

Crab 4 has also been equipped with travelling wheels 25, intended to run a rail shaped as a right-angled U-profile. Crab 4 is also equipped with units 26 comprising the components required for the operation of hoist motor 13.

FIG. 3 shows the details of the limit switch 24 of FIG. 2. This limit switch consists of a fixed disk 27 mounted on the shaft 15 as well as a number of disks 28 loosely attached to shaft 15. Each of the disks 27 and 28 has cams 29, positioned in such a manner that at each revolution of shaft 15 a new disk 28 will be brought into rotation along with disk 27. The number of disks 28 corresponds to the maximum number of revolutions for shaft 15 and thus the maximum moving length of straps 5. When the last disk has been brought into rotation, its cam 29 will after a revolution activate a pin 30 on a pivotal bearing plate 31, and turning of this plate will activate a micro switch 32 or 33, depending on the rotation direction, and thus the power supply for the hoist motor 13 will be cut off. A tension spring 34, positioned between a pin 35 on the plate 12 and a pin 36 on the plate 31 will keep plate 31 in neutral position.

FIG. 4 shows how straps 5 are mounted on shaft 15 at the slits 20. The end of the shaft may be hollow, as shown here, and the slit 20 will, therefore, not go through shaft 15 altogether. The hoist strap eye 5 will be inserted into slit 20, and a pin 37 is inserted from the end of shaft 15 through the eye of strap 5 and into a hole at the bottom of the hollow shaft end. Pin 37 is fixed by a screw 38 which is screwed into diametrically positioned holes at the end of shaft 15. Screw 38 may also be used if pin 37 is removed since it is provided with a threaded hole 39 at the end facing the end of shaft 15. FIG. 4 also shows unit 23 for the prevention of erroneous unwinding of hoist strap 5. This unit 23, offering additional safety against faulty operation if limit switch 24 fails, is explained further with reference to FIGS. 5 and 6. Unit 23 consists of a pin 40, provided with a thread 41 at one end and smooth at the other end. Pin 40 is pivotally embedded in bearing brackets 22 in holes out of which one has an interior thread 42 corresponding to thread 41. At pin 40 a dog roll 43 has been mounted to which has been attached a torsion spring 44 the other end of which has been attached to a pin 45 placed in one of the bearing brackets 22. Torsion spring 44 keeps pin 40 in neutral position, i.e. in a position where thread 41 is at a certain distance from a metal angle piece 46 placed opposite pin 40. One bearing bracket 22 directly connected with one pole of the power supply through plate 10 whereas angle piece 46 is connected with the other pole of the power supply through plate 11. FIG. 6 shows how hoist strap 5 works when properly unwound at shaft 15, and you will notice that strap 5 goes clear of dog roll 43 which will, therefore, remain at rest. FIG. 7 shows how things develop in case of erroneous unwinding of hoist strap 5 where its course has been changed and thus goes against dog roll 43 so that whilst wandering it will turn same. Owing to thread 41 pin 40 will shift towards angle piece 46, and after some revolutions pin 40 will touch angle piece 46 effecting a short circuit, and a short circuit switch in the fuse box will fall out.

FIGS. 8 and 9 show the arrangement between cross rails 3 and main rails 1. Each of the rails consists of a rectangular profile 47 with a U-shaped travel groove 48. In each of the travel grooves 48 on main rails 1 is embedded a trolley 49 consisting of a plate 50 with flanges 51 welded on to it in between which flanges travelling wheels 52 have been mounted. In the utmost free ends of plate 50, horizontal steering wheels 53 have been mounted. Crab rails 3 have been mounted on trolley 49 by angle iron 54 fixed to plate 50 by pins 55.

How rails 3 are attached to angle piece 54 has been shown in FIG. 9. In the vertical part of the angle piece there are two holes 56 through which bolts 57 may be led. Against angle piece 54 an insulating plate 58 is placed at one end of profile 47, then a wooden block 59 and a block 60 of elastic, flexible material, as well as a clamp plate 61. At the other end of profile 47, insulating plate 58 is left out, and at the same time an electrically conductive foil piece 62 is wrapped around block 60. In plate 58 and blocks 59 and 60 there are holes corresponding to holes 56 in angle piece 54, and in clamp plate 61 there are corresponding threaded holes into which bolt 57 may be screwed. The crosssection of blocks 59 and 60 more or less corresponds to the inner dimension of rectangular profile 47, and when mounting, the blocks 59 and 60 mounted on angle piece 54 are inserted into profile 47 after which bolts 57 are tightened, and block 60 will yield and be tight against the interior walls of profile 47. Rails 3 are thus at one end electrically connected with angle piece 54 and through trolley 49 by main rail 1 whereas at the other end they are insulated from angle piece 54 and thus from the other main rail 1.

FIG. 10 shows details of the fittings 2 used for mounting main rails 1 on the opposite walls of a room. Due to the fact that main rails 1 have to be absolutely parallel, it will be expedient to be able to adjust minor deviations in this parallel state during mounting. This is achieved by fittings 2 to the invention which will be explained in more detail in the following. Fittings 2 consist of a cover plate 63 which is mounted on the room wall by screws through holes 64. Plate 63 has a crank at 65 so that a cavity is established between the wall and the plate. In the crank part there are two parallel slits 66. A plate piece 67 has a retaining unit 68, firmly mounted, which fits narrowly into the rectangular profile 47 of the main rail. Plate piece 67 has on opposite sides or at opposite ends notches flush with each other. In the cavity between cover plate 63 and the room wall another plate 70 has been placed having two threaded holes into which screws 71 have been screwed. Screws 71 go through notches 69 and slits 66 into plate 70 so that when the screw is tightened, plates 67 and 70 are pressed against cover plate 63 and thus fixed. Thus, you achieve an adjustment of the main rail place of attachment since plates 67 and 70 may be displaced vertically along slits 66 whereas plate 67 may be displaced horizontally in notches 69.

The unit described above may be used for transport of persons, using various auxiliary equipment for suspension in hoist straps 5. With a view to this purpose hoist straps 5 are, as shown in FIG. 1, provided with supporting hooks 72, attached to hoist straps 5 by tightening units 73. As an additional measure with a view to unit operation safety, the supporting hooks are also equipped with spring units 74 which will determine maximum hoisting of the hoist straps since these spring units in case of continued hoisting of hoist straps, i.e. if the limit switch fails, will go against the two crab plates 10 and 11 and will thus generate a short circuit of the power supply and make the short circuit switch of fuse box 8 fall out and stop the hoist motor.

If power supply fails, or if the short circuit switch has fallen out, a person may be lowered down by an accumulator 75 (FIG. 2). This accumulator is connected to the hoist motor 13 by an additional pilot drive 76. Auxiliary accumulator 75 is continuously kept charged by a separate rectifier connected to plates 10 and 11.

To prevent continued operation of accumulator 75 after the straps 5 have reached their bottom position, end switch 24 has a third micro switch 33*a*, FIG. 3, which will disconnect the motor current from the accumulator when activated by plate 31.

As auxiliary equipment for carrying the person concerned, you may use a so-called breech hoist or a plate net, or a "deck chair hoist" to the invention may be used. The latter has been shown in FIG. 11 and consists of two rings 77 to be placed in supporting hooks 72. A short rod 78 and a longer rod 79 have been welded to these rings so that these two rods are more or less at right angles to each other. At thefree ends of these rods, a hook 80 has been shaped, and between the two rods of each rod set a third rod 81 has been welded, and thus the two rod sets constitute rigid units. In the hook-shaped parts of rods 78 and 79, cross rods 82 and 83 of suitable length have been fitted, and at their free ends they have been equipped with ring grooves 83 corresponding to hooks 80. Between the two cross rods 82 and 83 a fabric track 84 of linen or other suitable material has been placed, of such a length that it will, in the position shown in the figure, by itself form a seat part and a back part. The back part has, against rod 82, been provided with a notch 85. This "deck chair" is suspended in the hoist straps in that rings 77 are placed in supporting hooks 72. When a person is placed in the chair, it will usually assume the position shown in FIG. 11 but if cross rod 82 is pulled down, it may easily be tilted into a position where the person assumes a more or less lying position. Thus, fabric track 84 will get another bend, and if notch 85 in the fabric track was not there, the fabric track 84 would affect the person's neck in a rather unpleasant manner. If the person is placed for instance in a bed while the chair is being lowered, cross rods 82 and 83 may be lifted off the hooks 80 and possibly be pulled out from the fabric tracks. Notch 85 may also be a notch in the fabric track which, along the notch made along the edges of the fabric track, may be closed by zip fasteners.

The operation of the unit for vertical and horizontal transport of handicapped people will be explained with reference to the circuit diagramme in FIG. 12. Power will be supplied via a separator transformer TR1 contained in fuse box 8. FIG. 1, which also has a thermal fuse T1 and a short circuit switch R4 and an operation lamp L1. The secondary winding of transformer T1 of for instance 24 V is connected to the two main rails 1 via lines 9. Cross rails 3 are, as explained in connection with FIG. 9, insulated at opposite ends so that the two rails 3 are in conductive connection with a pole of the transformer each. The two crab halves 10 and 11 will thus be charged through travelling wheels 25, FIG. 2, and they are in the diagramme indicated by two thick lines. The unit has three relays R1, R2, and R3. Relay 1 is for going down and relay R2 for going up, and these relays receive power through switches 03 and 04, operated by manoeuvring cords 6 and 7, FIG. 1.

The switches 01 and 02 incorporated into the circuit of these relays are the switches of limit switch arrangement 24.

The motor current is supplied by a rectifier D1 via the respective relay switches, and further explanation should be superfluous.

Relay R3 is intended for emergency operation by an accumulator B1. This relay receives power through a switch 08, operated by manoeuvring cord 76, FIG. 1. Accumulator B1 is under constant charging voltage from a rectifier D2 which, via a switch in relay R3, is directly connected to the live plates 10 and 11. Switch 05 of the accumulator circuit is switch 32*a* of limit switch 24, FIG. 3.

Switches 06 and 07 short-circuit the power supply so that the short circuit relay R4 will fall out and cut power supply to one of the plates 10 and 11, and thus the crab will be short of power.

Switch 06 is the pin 40 placed in the erroneous winding unit 23. This pin is connected to one of plates 10 or 11 whereas angle piece 46 is connected to the other plate.

Switch 07 is the spring 74 mounted on the hoist straps 5. This spring goes against the two plates 10 and 11 if the hoist upwards continues after the limit switch 24 was supposed to have cut off the motor current.

As would appear from the above explanation of the unit to the invention, the latter has been made safe in every conceivable way. The low voltage of 24 Volts is being used in order that rails and crab may, without any danger to the patient or the person assisting him, may be used for motor current supply. Normal function makes the hoist stop in time, and should this fail, or erroneous unwinding occurs, the motor current will be cut rather quickly. In case of any such cut or in the case of network failure, the patient may always be lowered by using the accumulator. The latter has no capacity for hoisting upwards, a fact which would not serve any purpose, either, but the lowering of a patient just hoisted upwards from a chair or a bed is provided for at all times.

After a patient has been hoisted upwards, it will be comparatively easy to move this groove any place within the limitation of the main rails. Obviously, both the crab and the cross rails may be equipped with motors to allow for automatic moving.

I claim:

1. A coordinate-type hoist for a non-ambulatory individual, comprising:
 first and second fixed parallel longitudinal rails;
 means for mounting said rails in a horizontal plane near the ceiling of a room;
 third and fourth parallel transverse rails extending between and supported by said fixed rails for sliding movement in the longitudinal direction;
 a crab mounted for sliding movement on said third and fourth rails in the transverse direction;
 at least one hoisting strap depending from said crab for supporting an individual;
 a rotatable shaft means on said crab for winding and unwinding said straps to raise and lower the same;
 a hoist motor on said crab for rotating said shaft means;
 means for electrically insulating said motor from said crab;
 means including said longitudinal and transverse rails for supplying electrical power to said hoist motor;
 limit switch means coupled to said shaft means for disconnecting the power supply to said hoist motor when the number of rotations of said shaft means in either direction exceeds a corresponding predetermined value;
 cutoff switch means adjacent the paths of travel of said straps for disconnecting the power supply to said hoist motor when either of said paths deviate from a desired trajectory as a result of erroneous winding or unwinding thereof; and
 means independent of said power supplying means for lowering said straps.

2. The hoist according to claim 1, wherein said first and third rails are electrically connected to each other and to one portion of said crab to form a first power transmission line, and said second and fourth rails are electrically connected to each other and to another portion of said crab to form a second power transmission line insulated from said first line.

3. The hoist according to claim 1, wherein said limit switch means comprises a disk affixed to said shaft means for rotation therewith, a number of disks corresponding to said predetermined value, loosely mounted on said shaft means adjacent said fixed disk, cam means for causing said loosely mounted disks to successively rotate during successive revolutions of said shaft, and an electrical switch responsive to rotation of the last of said loosely mounted disks to be engaged by said cam means.

4. The hoist according to claim 1, wherein said cutoff switch means comprises a pivotally embedded pin having at one end thereof a thread engaging a fixed threaded hole, said pin having a firmly mounted dog roll, a torsion for keeping said dog roll in a given position, said dog roll being mounted so that in the case of erroneous unwinding said dog roll is deflected, thus making the pin rotate and turn into the threaded hole.

5. The hoist according to claim 1, further comprising means for vertical adjustment of said first and second rails.

6. The hoist according to claim 5, wherein said vertical adjustment means comprises a cover plate, means for mounting said plate on the wall of a room, a central crank having a central part with spaced parallel vertical slits, a second plate secured to at least one of said first and second rails, a tightening plate disposed adjacent the cover plate, notches in said second plate extending at a right angles to said vertical slits, and corresponding screws engaging each notch, an adjacent slit and said tightening plate.

7. The hoist according to claim 1, wherein each of said straps has a supporting hook including spring means for stopping said hoist motor upon engagement with said crab.

8. The hoist according to claim 1, further comprising a chair for suspension by said straps, comprising two rigid units in the shape of elongated, triangle-shaped rod systems having four angle tips, suspension rings placed in two of said angle tips, the two other angle tips having hooks opening upwards in which cross rods are disposed, and a fabric support mounted between said cross rods.

9. The hoist according to claim 1, further comprising battery means for lowering said straps in the event of failure of said power supply to said hoist motor.

10. The hoist according to claim 9, wherein said battery is rendered operative by operation of a separate maneuvering drive, thus energizing a relay which relay will cut off connections to the normal power supply.

* * * * *

UNITED STATES PATENT OFFICE

CERTIFICATE OF CORRECTION

Patent No. 4,202,064 Dated May 13, 1980

Inventor(s) Gunnar I. Joergensen

It is certified that error appears in the above-identified patent and that said Letters Patent are hereby corrected as shown below:

In the Abstract, 4th line from bottom: "mvoements" should be --movements--.

In the Abstract, last line: "of" should be --for--.

Column 4, line 5: "crosssection" should be --cross-section--.

Column 5, line 5: "thefree" should be --the free--.

Signed and Sealed this

*Eleventh* Day of *November 198(*

[SEAL]

*Attest:*

SIDNEY A. DIAMOND

*Attesting Officer* *Commissioner of Patents and Trademar*